US 6,876,486 B2

(12) United States Patent
Hiraoka et al.

(10) Patent No.: US 6,876,486 B2
(45) Date of Patent: Apr. 5, 2005

(54) PARTICLES FOR DISPLAY DEVICE, IMAGE DISPLAY MEDIUM USING THE SAME, AND IMAGE FORMING DEVICE

(75) Inventors: Satoshi Hiraoka, Minamiashigara (JP); Hidehiko Soyama, Minamiashigara (JP); Yasuo Yamamoto, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 13 days.

(21) Appl. No.: 10/658,532

(22) Filed: Sep. 10, 2003

(65) Prior Publication Data
US 2004/0190113 A1 Sep. 30, 2004

(30) Foreign Application Priority Data
Mar. 24, 2003 (JP) ........................................ 2003-081428

(51) Int. Cl.⁷ .......................... G02B 26/00; G09G 3/34; G03G 17/04
(52) U.S. Cl. ......................... 359/296; 345/107; 430/32
(58) Field of Search ........................ 359/296; 345/107; 430/32, 38

(56) References Cited

U.S. PATENT DOCUMENTS 6,157,801 A * 12/2000 Aita et al. .................. 399/175

FOREIGN PATENT DOCUMENTS

| JP | A 61-50186 | 3/1986 |
| JP | A 2001-34200 | 2/2001 |
| JP | A 2001-34202 | 2/2001 |
| JP | A 2001-188269 | 7/2001 |
| JP | A 2003-241230 | 8/2003 |

OTHER PUBLICATIONS

Gugrae–Jo et al., "New Toner Display Device (I)"; Japan Hardcopy '99; pp. 249–252.

* cited by examiner

Primary Examiner—Georgia Epps
Assistant Examiner—William Choi
(74) Attorney, Agent, or Firm—Oliff & Berridge, PLC

(57) ABSTRACT

An image display medium comprises a display substrate on which an image is displayed and a non-displaying substrate opposing to the substrate, wherein a spacer and black particles and white particles are enclosed between these substrates. The display substrate and non-display substrate each have a transparent electrode, wherein the transparent electrode for the non-display substrate is grounded and the transparent electrode for the display substrate is connected to voltage applying means. As these black particles and white particles, particles for a display device having a weight reduction rate of not more than 0.3% at 100° C. to 240° C. are respectively used.

21 Claims, 11 Drawing Sheets

FIG. I

PARTICLES FOR DISPLAY DEVICE, IMAGE DISPLAY MEDIUM USING THE SAME, AND IMAGE FORMING DEVICE

CROSS-REFERENCE TO RELATED APPLICATION

This application claims priority under 35 USC 119 from Japanese Patent Application No. 2003-81428, the disclosure of which is incorporated by reference herein.

BACKGROUND OF THE INVENTION

1. Field of the Invention

The present invention relates to an image display medium which can be reiteratively writable, and particles for a display device used therefor, and an image forming device.

2. Description of the Related Art

Conventionally, display techniques such as Twisting Ball Display (display by rotation of particles separately colored with two-colors), electrophoresis, magnetophoresis, thermal rewritable medium, liquid crystals having memory ability, and the like have been provided as a reiteratively writable image display medium. These display techniques provide good memory ability of images, but they have problems that the display surface is not displayed as white as paper and that the contrast is decreased.

As a display technique using a toner, which solves the above-mentioned problems, Japan Hardcopy '99, collected papers, pp. 249–252 suggests a display technique, which displays an image by enclosing a electro-conductive color toner and white particles between opposed electrode substrates, injecting electric charge to the electro-conductive color toner via a charge transport layer provided on the surfaces inside of the electrodes of the non-displaying substrate, wherein the charge-injected electro-conductive color toner moves to the display substrate positioned opposed to the non-displaying substrate via the electric field between the electrode substrates, and the charge-injected electro-conductive color toner adheres inside of the display substrate to display an image by the contrast of the electro-conductive color toner and white particles.

The display technique is superior in that the image display medium is entirely composed of solid, and that the display by black and white can be converted by 100% in principle. However, according to the technique, there exist electro-conductive color toner being not contacted with the charge transport layer provided on the surface of inside of the electrode of the non-displaying substrate and electro-conductive color toner isolated from the other electro-conductive color toner. Since these electro-conductive color toners are not injected with electron charge, they exist randomly in the gap between the substrates without moving by electric field, which causes problem of decrease in contrast.

In order to improve such problems, an image display medium comprising a pair of substrates and plural kinds of particles, which are enclosed between the substrates, wherein the particles can move between the substrates by applied electron charge and having different colors and electrification properties, has been provided. According to the providing, high whiteness and high contrast can be obtained.

According to the providing, high whiteness and high contrast can be obtained. The composition of the provided particles is superior in initial density of whiteness, initial density of blackness and initial contrast. However, when the medium is reiteratively written, the contrast is decreased due to decrease in the density of the image, and image unevenness is generated due to decrease in the uniformity of the image.

SUMMARY OF THE INVENTION

Therefore, an object of the present invention is to solve the above-mentioned conventional problems and to achieve the following objects.

Namely, an object of the invention is to provide particles for a display device, which do not decrease the contrast due to decrease in the density of the image and do not generate image unevenness due to decrease in the uniformity of the image during reiterative writing. Furthermore, another object of the invention is to provide an image display medium, whose driving voltage can be set lower, and which can ensure a stable display image for a long period even under external impact or long-time standing, and an image forming device using the same.

The above-mentioned objects can be achieved by the following means.

(1) Particles for a display device which can be positively or negatively charged and have a color, wherein the particles have a weight reduction rate of not more than 0.3% at 100° C. to 240° C.

(2) An image display medium, which comprises a pair of opposed substrates and a group of particles comprising at least two or more kinds of particles, the group being enclosed in a gap between the pair of substrates, wherein at least one of the two or more kinds of particles can be positively charged and at least one of the other particles can be negatively charged, and the particles which can be positively charged and the particles which can be negatively charged have colors that are different from each other, and wherein the particles which can be positively charged and the particles which can be negatively charged have a weight reduction rate of not more than 0.3% at 100° C. to 240° C.

(3) An image forming device comprising an image display medium comprising a pair of opposed substrates and a group of particles comprising at least two or more kinds of particles, which group is enclosed in a gap between the pair of substrates, wherein at least one of the two or more kinds of particles can be positively charged by external stimulation and at least one of the other particles can be negatively charged by external stimulation, and the particles which can be positively charged by external stimulation and the particles which can be negatively charged by external stimulation have colors that are different from each other; and electric field production means for producing an electric field corresponding to an image, between the pair of substrates, wherein the particles which can be positively charged and the particles which can be negatively charged have a weight reduction rate of not more than 0.3% at 100° C. to 240° C.

DETAILED DESCRIPTION OF THE INVENTION

Hereinafter, detailed explanation will be given of the particles for a display device, the image display medium using the particles for a display device, and the image forming device, of the present invention.

[Constitution of the Particles for a Display Device of the Present Invention]

The particles for a display device of the present invention are characterized that they have not more than 0.3% of a weight reduction rate at 100° C. to 240° C. The particles comprising particles capable of being positively or negatively charged and having colors that are different from each other are used for the image display medium of the present invention. By the difference of colors, the contrast can be obtained between the image portion composed of the particles capable of being positively charged and the image portion composed of the particles capable of being negatively charged. Therefore, by adjusting the weight reduction rate of the particles at 100° C. to 240° C. to not more than 0.3%, the adhesion force of the particles to the substrates can be suitably enhanced. Furthermore, decrease in contrast due to decrease in density of the image does not occur during reiterative writing. Moreover, image unevenness due to decrease in uniformity of the image can be prevented.

When the particles for a display device are heated, volatile components such as residual monomers, and the like included in the particles are extracted by 240° C. On the other hand, when the particles are heated to the temperature higher than 240° C., the components constituting the particles may be decomposed and the decomposed products may be extracted. Therefore, the present invention defines the particles for a display device by the weight reduction rate in the range of 100° C. to 240° C.

In the present invention, the weight reduction rate means that of the entire particles, because particles having plural colors are used in combination for the particles for a display device.

The particles for a display device of the present invention have a weight reduction rate of not more than 0.3%, preferably not more than 0.25%, more preferably not more than 0.2% at 100° C. to 240° C. When the weight reduction rate exceeds 0.3%, the adhesion force between the particles and the substrates increases.

Figure 11:
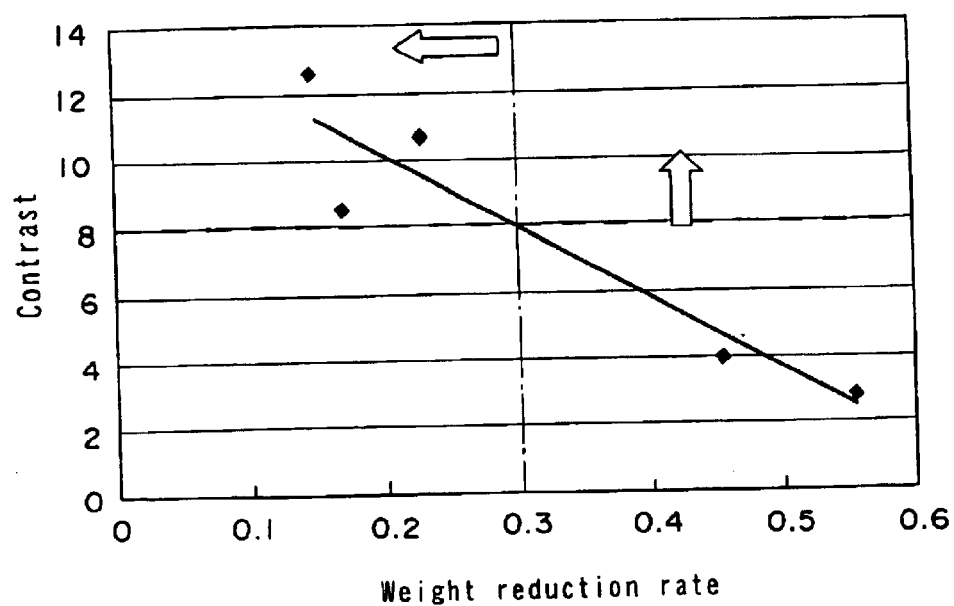
FIG. 11 is a graph showing the relation between the weight reduction rate of the particles for a display device and contrast.

FIG. 11 shows the relationship, in an image display medium using white particles and black particles, between the weight reduction rate of the particles for a display device and contrast. In the present invention, the contrast means, as mentioned below, the value calculated using the average black reflection density and average white reflection density. In order to achieve the specification value (not less than 8) of contrast required by the present inventors, the weight reduction rate needs to be not more than 0.3%.

The weight reduction rate at 100° C. to 240° C. of the particles for a display device is a value measured by a thermogravimeter.

The weight reduction rate of the particles for a display device of the present invention is a value obtained by the following method.

First, a sample of about 10 mg is accurately measured in a predetermined aluminum container and set in a thermogravimeter. A thermal program is set at a temperature programming rate of 10° C./min, and the sample is heated to 500° C. At this time, a measurement is performed in the presence of nitrogen flow. Based on the obtained value, a difference between the weights of the sample at 240° C. and 100° C., i.e., an amount of decrease, is calculated. The amount of decrease is divided by the weight of the sample at room temperature before measurement and then multiplied by 100 to obtain the weight reduction rate (%).

For adjusting the weight reduction rate of the particles for a display device of the present invention at 100° C. to 240° C. to not more than 0.3%, for example, a method such as thoroughly washing the prepared particles, and the like are exemplified. That is, particles for a display device produced by undergoing a washing step are preferred.

As a method for washing the particles for controlling the weight reduction rate, a method comprising dispersing and stirring the particles for a display device in water or an organic solvent is desired. The amount of the water or organic solvent to be used is desirably 10-fold amounts relative to the mass of the particles for stirring and washing. The tools for the stirring include a magnetic stirrer, a three-one motor, a ball mill, and the like. The period for stirring is preferably not less than 1 hr, and more preferably 2 hrs. The organic solvent includes alcohols such as methyl alcohol, ethyl alcohol, isopropyl alcohol, and the like. After the washing for a predetermined period and filtration, the particles are dried and pulverized, and then collected. The method for drying includes vacuum drying, lyophilization, and the like. The temperature for drying is preferably not less than 40° C., and more preferably 65° C. The period for drying is desirably not less than 3 hrs.

It is considered that the weight reduction rate is decreased by thoroughly washing the particles as mentioned above, whereby impurities are extracted from the particles.

Besides the above methods, methods for adjusting the weight reduction rate of the particles for a display device of the present invention at 100° C. to 240° C. to not more than 0.3% include a method comprising dispersing the particles in the solvent and heating and applying vacuum to the obtained dispersion liquid. That is to say, a method comprising heating a dispersion liquid in which the particles have been dispersed in a solvent such as water, and the like, drawing a vacuum to vaporize the solvent to extract impurities, and the like.

The particles for a display device of the present invention are comprising at least a colorant and a resin, and which may, if necessary, comprise a charge controlling agent or polymer particles. The colorant may double as a charge controlling agent.

(Colorant)

As the colorant, the following are exemplified.

A black colorant includes black materials such as organic or inorganic dyes or pigments such as carbon black, black titanium oxides, magnetic powder, oil black, and the like.

A white colorant includes white pigments such as rutile-type titanium dioxide, anatase-type titanium dioxide, Chinese white, lead white, aluminum oxide, silicon dioxide, zirconium oxide, and the like.

Besides the above-mentioned, the colorants includes those having chromatic color such as phthalocyanine pigments, quinacridone pigments, azopigments, fused pigments, insoluble lake pigments, dyes or pigments of inorganic oxides, and the like can be used. Specific examples thereof include preferably aniline blue, chalcoyl blue, chrome yellow, ultramarine blue, Du Pont oil red, quinoline yellow, methylene blue chloride, phthalocyanine blue, malachite green oxalate, lamp black, rose bengal, C. I. Pigment Red 48:1, C. I. Pigment Red 122, C. I. Pigment Red 57:1, C. I. Pigment Yellow 97, C. I. Pigment Blue 15:1, C. I. Pigment Blue 15:3, and the like.

These dyes and pigments may, if necessary, treated on the surface for improving dispersion property.

The specific pigments having chromatic color include pigments for a color filter, and the like. Specifically, blue pigments having the absorption maximum in the range of 400 nm to 500 nm, green pigments having the absorption maximum in the range of 500 nm to 600 nm and red pigments having the absorption maximum in the range of 600 nm to 700 nm, and the like are exemplified. More specifically, examples for the blue pigments include C. I. Pigment Blue 15 (15:3, 15:4, 15:6, and the like), 21, 22, 60, 64, and the like, examples for the green pigments include C. I. Pigment Green 7, 10, 36, 47, and the like, and examples for the red pigments include C. I. Pigment Red 9, 97, 122, 123, 144, 149, 166, 168, 177, 180, 192, 215, 216, 224, and the like.

These specific pigments are preferably used as a master batch pigment. Here, the master batch is a preliminary mixture for the final product (the particles for a display device for the present invention), which is created aiming at improving costs for mixing of the colorants and dispersion and uniformity of the colorants, and aiming at improving easiness for injection, extrusion molding, measurement, and the like. The master batch is obtained by mixing a pigment having desired color at high density (generally 5 to 50% by mass) into a resin as a starting material, kneading the mixture and forming the mixture into pellets (or flakes, plates).

The resin as a starting material to be used for the master batch includes homopolymers and copolymers of radical polymerizable monomers such as styrene, methylstyrene, chlorostyrene, vinyl acetate, vinyl propionate, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, acrylonitrile, methacrylonitrile, acrylamide, methacrylamide, glycidyl acrylate, glycidyl methacrylate, acrylic acid, methacrylic acid, 2-vinylpyridine, and the like, as well as polyester resins, polyamide resins and epoxy resins, and the like.

Hereinafter the method for producing a master batch pigment is exemplified. Firstly, the specific pigment and the resin as a starting material are crushed and dispersed in an organic solvent to give a pigment dispersion liquid. Here, for the crushing and dispersing treatment, a media stirring mill such as a sand mill, a ball mill, an atriter, and the like can be used. Furthermore, the crushing and dispersing treatment can be carried out by either batch process or continuous process. The organic solvent is thereafter removed from the pigment dispersion liquid, and the residue was crushed to give a master batch pigment in which the specific pigment has been uniformly dispersed in the resin as a starting material.

When the particles for a display device of the present invention are produced using the thus-obtained master batch pigment, the master batch pigment is added to a monomer and dispersed before use.

The structure of the colorant that doubles as a charge controlling agent includes those having electron attractive groups or electron donating groups, those being ametal complex, and the like. Specific examples thereof include C. I. Pigment Violet 1, C. I. Pigment Violet 3, C. I. Pigment Violet 23, C. I. Pigment Black 1, and the like.

The amount of the colorant to be added is, when the specific gravity of the colorant is taken to be 1, preferably in the range of 1 to 60% by mass, more preferably in the range of 5 to 50% by mass relative to the whole particles.

Furthermore, when the colorant is the specific pigment, the amount of the colorant to be added is, when the specific gravity of the colorant is taken to be 1, preferably in the range of 1 to 60% by mass, more preferably in the range of 5 to 30% by mass relative to the whole particles.

(Resin)

As the resin, polyvinyl resins such as polyolefin, polystyrene, acrylic resin, polyacrylonitrile, polyvinyl acetate, polyvinyl alcohol, vinyl chloride, polyvinyl butyral, and the like; vinyl chloride-vinyl acetate copolymer; styrene-acrylic acid copolymer; straight silicon resin composed of organosiloxane bonds, and a modified polymer thereof; fluorine-contained resins such as polytetrafluoroethylene, polyvinyl fluoride, polyvinylidene fluoride, and the like; polyester, polyurethane, polycarbonate; amino resins; epoxy resins, and the like are exemplified. One of these resins can be solely used, or plural of these resins can be used as a mixture. The resin may be cross-linked. Furthermore, known binder resins, which are known as a main component for toners used for the conventional electrophotography, can be used as a resin without any problems. Specifically, resins containing a cross-linking component is preferable for use.

(Other Additives)

In the particles for a display device of the present invention, the overall specific gravity of the particles for a display device can be decreased by incorporating polymer particles having a low specific gravity into the particles, and by decreasing the amount of the colorant which has a high specific gravity. That is, the specific gravity of the whole particles for a display device can be decreased by substituting a part of the colorant, which provide the largest effect on the specific gravity in the particles for a display device, with the polymer particles having low specific gravity.

In this way, the specific gravity of the particles for a display device of the present invention as well as intermolecular cohesiveness can be decreased. Furthermore, due to the light scattering of the internal polymer particles, the optical reflection density of the particles for a display device of the present invention can be set higher even the amount of the colorant is decreased.

As the polymer particles, conventionally known polymers can be used. However, those having lower specific gravity than that of the colorant used in combination are preferably used. Furthermore, when the polymer particles have a color, the polymer particles are suitably selected in consideration of the color possessed by the colorants used in combination. Moreover, as the resin to be used in combination, those mentioned below can be used. Of these, methacrylic resin or acrylic resin is preferably used.

The polymer particles specifically include, but not limited to, polystyrene resin, polymethyl methacrylate resin, urea-formalin resin, styrene-acrylic resin, polyethylene resin, polyvinylidene fluoride, and the like. These can be used solely or in combination. The resin preferably has a crosslinked structure, and further preferably has higher refractive index than that of the resin used in combination.

The polymer particles, having a form such as spherical shape, amorphous shape, tabular shape, and the like can be used. Of those, particles having spherical shape are preferable.

The polymer particles in which the volume average particle diameter is smaller than that for the particles for a display device can be used. The volume average particle diameter is preferably not more than 10 μm, more preferably not more than 5 μm. The particle size distribution is preferably sharp, more preferably monodispersed.

Furthermore, in view of producing particles for a display device having smaller specific gravity, a part of or all of the polymer particles are preferably hollow particles. The hollow particles in which the volume average particle diameter is smaller than that of the particles for a display device can be used. The volume average particle diameter is preferably not more than 10 μm, more preferably not more than 5 μm. Specifically, in the case of the hollow particles, the volume average particle diameter is preferably 0.1 μm to 1 μm, more preferably 0.2 μm to 0.5 μm in view of light scattering.

In the present invention, the "hollow particles" means particles having voids in the particles. The voids are preferably contained by 10% to 90%. Furthermore, the "hollow particles" may be hollow capsules or particles having porous outer wall.

The hollow particles can enhance whiteness and masking effect by utilizing light scattering, which is produced by the difference of refractive indices of the resin layer and inner air layer in the case of hollow capsules, or by the difference of refractive indices of the outer layer and void in the case of particles having porous outer layer. Therefore, the hollow particles are preferably included in white particles for a display device.

The amount to be added of the polymer particles is preferably in the range of 1% to 40% by mass, more preferably in the range of 1% to 20% by mass relative to the particles for a display device. When the amount to be added of the polymer particles is less than 1% by mass, the effect by decreasing the specific gravity by addition of the polymer particles is difficult to be exhibited. When the amount to be added of the polymer particles is more than 40% by mass, the production efficiency, such as dispersibility etc, for the production of the preferred particles for a display device. may be deteriorated.

To the particles for a display device of the present invention, if necessary, a charge controlling agent may be added for controlling charging property. As the charge controlling agent, known agents used for toner materials for electorophotography can be used. For example, cetyl pyridyl chloride, quaternary ammonium salts such as P-51, P-53 (manufactured by Orient Chemical Industries, Ltd.), and the like, salicylic acid metal complex, phenol condensate, tetraphenyl compound, calixarene compound, metal oxide particles, metal oxide particles subjected to a surface treatment by various coupling agents, can be exemplified.

The charge controlling agent is preferably colorless, or that having low coloring power or having the same type color as that of the whole particles. By using the charge controlling agent being colorless, having low coloring power, or having the same type color as that of the whole particles (namely, having the same type color as that of the colorant contained in the particles), an impact on the hue of the particles can be decreased.

In the present invention, the "colorless" means having no color. The "having low coloring power" means that the effect of the charge controlling agent on the color of the whole particles is low. Furthermore, "having the same type color as that of the whole particles" means that the charge controlling agent itself has a hue, but the hue is the same as or similar to that of the whole particles, which results low effect on the color of the whole particles. For example, for the particles containing a white pigment as a colorant, a white charge controlling agent is in the category of "having the same type color as that of the whole particles". In any case, the color of the charge controlling agent may be any color as long as the color of the particles containing the charge controlling agent becomes desired color, whether it is "colorless", "having low coloring power" or "having the same type color as that of the whole particles".

The amount of the charge controlling agent to be added is preferably 0.1 to 10% by mass, more preferably 0.5 to 5% by mass. Furthermore, the size of the dispersion unit in the particles of the charge controlling agent is preferably not more than 5 μm, more preferably not more than 1 μm by volume average particle diameter. In addition, the charge controlling agent may be present in the particles in a compatible state.

The particles for a display device of the present invention preferably further contain a resistance controlling agent. By adding a resistance controlling agent, charge exchange between the particles can be accelerated, whereby earlier stabilization of a displayed image can be achieved. In the present invention, the resistance controlling agent means conductive micropowder, preferably conductive micropowder which produces suitable exchange and leakage of charge. By using the resistance controlling agent in combination, friction between the particles for a long period or increase of charge of the particles by friction between the particles and surface of the substrate, so-called charge-up, can be avoided.

As the resistance controlling agent, inorganic micropowder having the volume resistivity of preferably not more than $1 \times 10^6$ Ωcm, more preferably not more than $1 \times 10^4$ Ωcm is exemplified. Specifically, for example, tin oxide, titanium oxide, zinc oxide, iron oxide, particles coated with various conductive oxides, (e.g., titanium oxide coated with tin oxide, and the like,) and the like are exemplified. The resistance controlling agent is preferably colorless, having low coloring power or having the same type color as that of the whole particles. The definitions for these terms are as explained for the charge controlling agent. The amount of the resistance controlling agent to be added may be any amount as long as it does not interfere the color of the colored particles, and preferably about 0.1 to 10% by mass.

Although the particle size of the particles for a display device of the present invention cannot be generally mentioned, the volume average particle diameter is preferably about 1 to 100 μm, more preferably about 3 to 30 μm in order to obtain fine image. The particle size distribution thereof is preferably sharp, more preferably monodispersed.

(Production Method for Particles for a Display Device)

The production method for the particles for a display device of the present invention includes wet-type method for producing spherical particles, such as suspension polymerization step, emulsion polymerization step, dispersion polymerization step, and the like, crushing and classifying method for producing conventional amorphous shape particles, and the like. In addition, in order to uniformize the form of the particles, the particles may be applied the heat treatment.

Alternatively, the form of the particles can be uniformized by classification operation. For example, the classification may include, but not limited to, classification by various oscillating sieves, ultrasonic sieves, air sieves, wet-type sieves, or rotor rotating type classifier using the principal of centrifugal force, wind power classifier, and the like. By using these methods, solely or in combination, the particle size distribution can be adjusted to the desired range. When the particle size distribution is need to be precisely adjusted, a wet-type sieve is preferably used.

Further, preferable examples of the method for controlling the form of the particles (method for controlling shape factor) include a so-called suspension polymerization method disclosed in Japanese Patent Application Laid-open (JP-A) No. 10-10775, which method comprises dissolving a polymer in a solvent, adding a colorant to the solvent, and dispersing the mixture in an aqueous medium in the presence of an inorganic dispersing agent to form particles, wherein an organic solvent, which is compatible with a monomer, has no or little compatibility with the solvent, and is not polymerizable, is further added, suspension polymerization is carried out to produce particles, the particles are collected and dried using a suitably selected drying method for removing the organic solvent. The drying method is preferably a lyophilization method, which method is preferably carried out in the temperature range of −10° C. to −200° C., more preferably −30° C. to −180° C. In addition, the lyophilization method is carried out at the pressure of about not more than 40 Pa, preferably not more than 13 Pa.

The organic solvent includes ester solvents such as methyl acetate, propyl acetate, and the like, ether solvents such as diethylether, and the like, ketone solvents such as methyl ethyl ketone, methyl isopropyl ketone, methyl isobutyl ketone, and the like, hydrocarbon solvents such as toluene, cyclohexane, and the like, halogenated hydrocarbon solvents such as dichloromethane, chloroform, trichloroethylene, and the like. These solvents preferably can dissolve polymers, and the ratio thereof to be dissolved in water is preferably about 0 to 30% by mass. Specifically, during industrialization, the solvent is preferably cyclohexane in view of safety, cost and productivity.

Alternatively, a method disclosed in JP-A No. 2000-292971, which comprises aggregating small particles, combining the small particles to enlarge the particles to the desired particle size, can be used. Furthermore, the form of the particles can be controlled by a method comprising applying mechanical impact (e.g., Hybridizer (manufactured by Nara Machinery Co., Ltd.), Angmill (manufactured by Hosokawa Micron Corporation), θ-Composer (manufactured by Tokuju Co. Ltd.), and the like) to the particles obtained by conventional known method such as melt-kneading, crushing, classifying, and the like, or a method comprising heating, and the like.

[Image Display Medium of the Present Invention]

The image display medium of the present invention comprises a pair of opposed substrates and a group of particles comprising at least two or more kinds of particles, the group being enclosed in a gap between the pair of substrates, wherein at least one of the two or more kinds of particles can be positively charged and at least one of the other particles can be negatively charged, and the particles which can be positively charged and the particles which can be negatively charged have colors that are different from each other, and wherein the particles which can be positively charged and the particles which can be negatively charged are the particles for a display device of the present invention. By using the particles for a display device of the present invention, the driving voltage can be decreased, and stable display image can ensured for a long period even under external impact or long-time standing.

(Group of Particles Comprising at Least Two or More Kinds of Particles)

In the group of particles comprising at least two or more kinds of particles for the present invention, at least one of the two or more kinds of particles (the first particles) can be positively charged and at least one of the other particles (the second particles) can be negatively charged, and the particles which can be positively charged and the particles which can be negatively charged have colors that are different from each other.

In the image display medium of the present invention, the above-mentioned problems have been solved by decreasing the specific gravity of at least one of the first and second particles. That is, in the image display device of the present invention, by using, as at least one of the first particles and the second particles, the particles for a display device of the present invention whose specific gravity has been decreased, aggregation between the particles and release property thereof with respect to a substrate are decreased, whereby a stable display image can be ensured. Therefore, the image display medium of the present invention can decrease the driving voltage and can ensure stable display image for a long period even under external impact or long-time standing.

Although the above explanation is expressed with assuming that the first particles which can be positively charged and the second particles which can be negatively charged are each one kind, the particles may comprise only one kind or two or more kinds of particles without any problems. Even either of the particles contains two or more kinds of particles, the effect of the present invention can be exhibited in a similar manner as mentioned above, as long as one of the particles are the particles for a display device of the present invention.

Hereinafter the first and second particles, i.e., the both particles which can be positively or negatively charged for the image display device of the present invention are generically referred to as "display particles". In the display particles, both particles are preferably composed of the particles for a display device of the present invention. However, the conventional known particles as mentioned below can be used in combination.

The conventional known particles which can be used in combination are composed of at least a colorant and a resin. As the colorant and resin, those similar for the particles for a display device of the present invention can be used. Furthermore, the particles can include a charge controlling agent, or the colorant may double as a charge controlling agent.

In the image display device of the present invention, one of the display particles are preferably white particles. In other words, one of the display particles preferably contain a white colorant. By using the white particles as one of the display particles, the staining power and contrast of the other particles can be improved. The white colorant is preferably titanium dioxide. By using titanium dioxide as a colorant, the masking power in the range of wavelength of visible light can be improved, whereby the contrast can be further improved. The white colorant is specifically preferably rutile-type titanium oxide.

Two or more kinds of titanium oxides each having different particle sizes are preferably used in combination.

Generally, titanium oxide has bad dispersibility, and even the dispersibility of titanium oxide having high particle size is increased, the second and third aggregations occur rapidly, because of heavy specific gravity, and dispersion stability is deteriorated, whereby masking property is not sufficiently exhibited. On the other hand, titanium oxide having small particle size cannot produce sufficient light scattering, which results low masking property. Therefore, by using two or more kinds of titanium oxides each having different particle size, both dispersion stability and masking property can be improved.

The primary particle size of the titanium oxide that can be used for the present invention is preferably 0.1 μm to 1.0 μm for at least one kind of the particles, which size provides optically high masking property. The primary particle size of the other titanium oxide is preferably less than 0.1 μm.

Furthermore, titanium oxide having small particle size may be subjected to a surface treatment. The finishing agent which can be used for the surface treatment may include a solution of various coupling agents or an organic substance, as long as it does not affect on whiteness.

Since the white display particles containing titanium oxide have specifically higher specific gravity than those for other display particles, it is specifically preferable to use the above-mentioned particles for a display device of the present invention for the display particles. Furthermore, by using hollow particles for the polymer particles included in the particles for a display device, whiteness can be enhanced, whereby more higher contrast can be expected.

The invention is not limited to the embodiment in which one of the display particles is white. For example, one of the display particles maybe black. This is specifically effective when black characters and symbols and other color characters and symbols are switched each other.

Furthermore, the display particles are need to be adjusted so that one of the display particles can be positively charged and the other display particles can be negatively charged. When the different kinds of particles are charged by impingement or friction, one of the particles are positively charged and the other particles are negatively charged, according to the relationship of the positions of electrification rank of the both particles. Therefore, by suitably selecting the above-mentioned charge controlling agent, the positions of electrification rank can be suitably adjusted.

For the particle size of the display particles, for example, by using the white particles and black particles which have almost similar particle size and distribution, the adhesion state, i.e., particles having large particle size are surrounded by particles having small particle size, like a two component developer, can be avoided. Therefore, high density of whiteness and high density of blackness are obtained. The coefficient of variation is preferably not more than about 15%, particularly preferably monodispersion. The particles having small particle size may sometimes adhere around the particles having large particle size to decrease the color density essentially possessed by the large particles. Furthermore, the contrast may sometimes be varied depending on the mixing ratio of white particles and black particles. The mixing ratio that makes the surface areas of the display particles almost similar is desired. When the mixing ratio is highly deviated from this ratio, the color of particles of larger ratio may appear strongly. However, this is not applied when a contrast by a display with deep color tone and faint color tone of single color is desired, or when a display by mixed color of the two kind of colored particles is desired.

(Substrate)

The substrate used for the invention is a pair of substrates which are oppositely placed, and the above-mentioned particles for a display device are enclosed in the gap between the pair of substrates. In the present invention, the substrate is a plate having conductivity (a conductive substrate). In order to provide function as an image display medium, at least one of the substrate of the pair of substrates needs to be a transparent conductive substrate. In this case, the transparent conductive substrate serves as a display substrate.

The substrate as it is maybe conductive. Alternatively, an insulative substrate in which conductivity is provided on the surface may be used for the conductive substrate. The substrate may be crystalline or amorphous. The substrate as it is having conductivity may include metals such as aluminum, stainless steel, nickel, chromium, and the like and an alloy crystalline thereof, semiconductors such as Si, GaAs, GaP, GaN, SiC, ZnO, and the like.

The insulative substrate may include polymer film, glass, quartz, ceramic, and the like. The treatment for providing conductivity to the insulative substrate can be carried out by forming a film comprising the metals as mentioned as the specific examples of the substrate as it is having conductivity, or gold, silver, copper, and the like, by deposition, spattering, ion plating, and the like.

As the transparent conductive substrate, a conductive substrate comprising an insulative transparent substrate on which a transparent electrode is formed, or a transparent substrate as it is having conductivity is used. The transparent substrate as it is having conductivity may include transparent conductive materials such as ITO, zinc oxide, tin oxide, lead oxide, indium oxide, copper iodide, and the like.

As the insulative transparent substrate, transparent inorganic materials such as glass, quartz, sapphire, MgO, LiF, $CaF_2$, and the like, films or plate made of transparent organic resins such as fluorine-contained resin, polyester, polycarbonate, polyethylene, polyethylene terephthalate, epoxy, and the like can be used. Furthermore, optical fiber, Selfoc optical plate can be also used.

The transparent electrode formed onto one surface of the transparent substrate, those formed by deposition, spattering, ion plating, and the like using transparent conductive materials such as ITO, zinc oxide, tin oxide, lead oxide, indium oxide, copper iodide, and the like, or those formed by thinly depositing or sputtering metals such as Al, Ni, Au, and the like so that the electrode becomes translucent, can be used.

For these substrates, the surface of the opposing substrate may affect the charging polarity of the above-mentioned particles. Therefore, in a preferable embodiment, a protective layer having suitable surface state is provided on the surface. The protective layer can be selected in view of adhesive property to the substrate, transparency and electrification rank, as well as low contamination on the surface. Specific materials for the protective layer may include polycarbonate resin, vinyl silicone resin, fluorine-contained resin, and the like. The resin is selected according to the constitution of the main monomer of the particles to be used, and a resin having low friction charging with the particles is selected.

[Embodiments for Carrying Out the Image Forming Device of the Present Invention]

Hereinafter the embodiments for carrying out the image forming device of the present invention using the image display medium of the present invention are specifically explained with referring to the drawings. The members having the similar function have the same number throughout all drawings, and the explanation for the similar member is sometimes omitted.

First Embodiment

Figure 1:
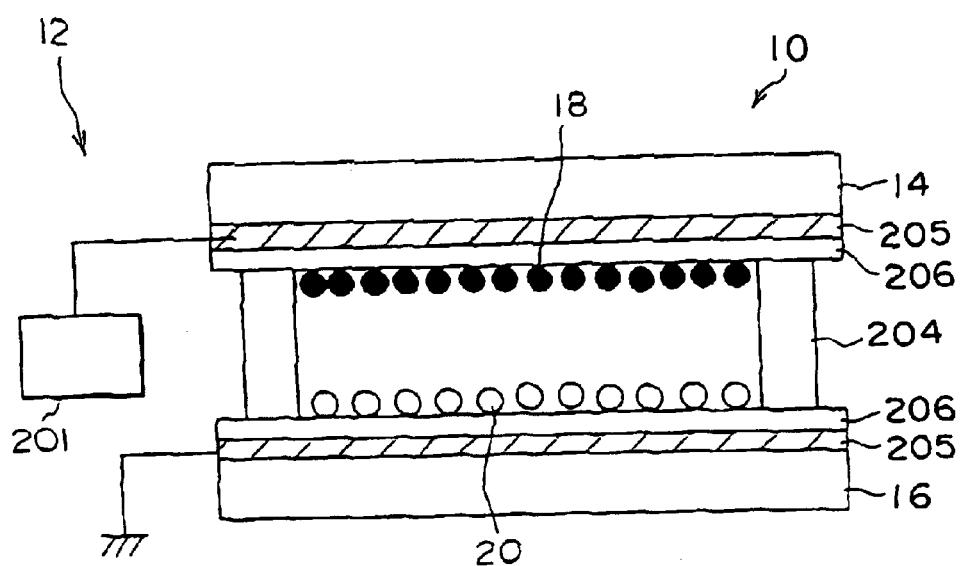
FIG. 1 is a schematic diagram of the image forming device according to the first embodiment.

FIG. 1 shows an image display medium according to the present embodiment for carrying out the invention, and an image forming device for forming an image on the image display medium.

As shown in FIG. 1, an image forming device 12 according to the first embodiment comprises voltage applying means 201. A image display medium 10 comprises a display substrate 14 on which an image is displayed and a non-display substrate 16 opposed to the display substrate 14, wherein a spacer 204, black particles 18 and white particles 20 are enclosed between the substrates 14 and 16. The display substrate 14 and non-display substrate 16 each have a transparent electrode 205 as mentioned below. The transparent electrode 205 on the non-display substrate 16 is grounded, and the transparent electrode 205 on the display substrate 14 is connected to the voltage applying means 201.

Next, the image display medium 10 is specifically explained.

For the display substrate 14 and non-display substrate 16, which constitute the outside of the image display medium 10, for example, a 7059 glass substrate comprising a transparent electrode ITO of 50×50×1.1 mm is used. The inner surface 206 of the glass substrate, which is to be contacted with the particles between the substrates, is coated with a polycarbonate resin (PC-Z) by the thickness of 5 $\mu$m. The center portion (square of 15×15 mm) of a silicone rubber plate 204 (40×40×0.3 mm) is cut out to form a space, and the silicone rubber plate 204 is provided on the non-display substrate 16. For example, spherical white particles 20 containing titanium oxide and having the volume average particle diameter of 20 $\mu$m and spherical black particles 18 containing carbon black and having the volume average particle diameter of 20 $\mu$m are mixed by the mass ratio of 2:1, and the mixed particles (about 15 mg) are shaken through a screen into the square space in the silicone rubber plate 204. The display substrate 14 is then adhered to the silicone rubber plate, and both substrates are pressed and held tight with a double clip to adhere the substrates with the silicone rubber plate to form the image display medium 10.

Second Embodiment

Hereinafter the second embodiment of the present invention is specifically explained with referring to the drawings.

Figure 2:
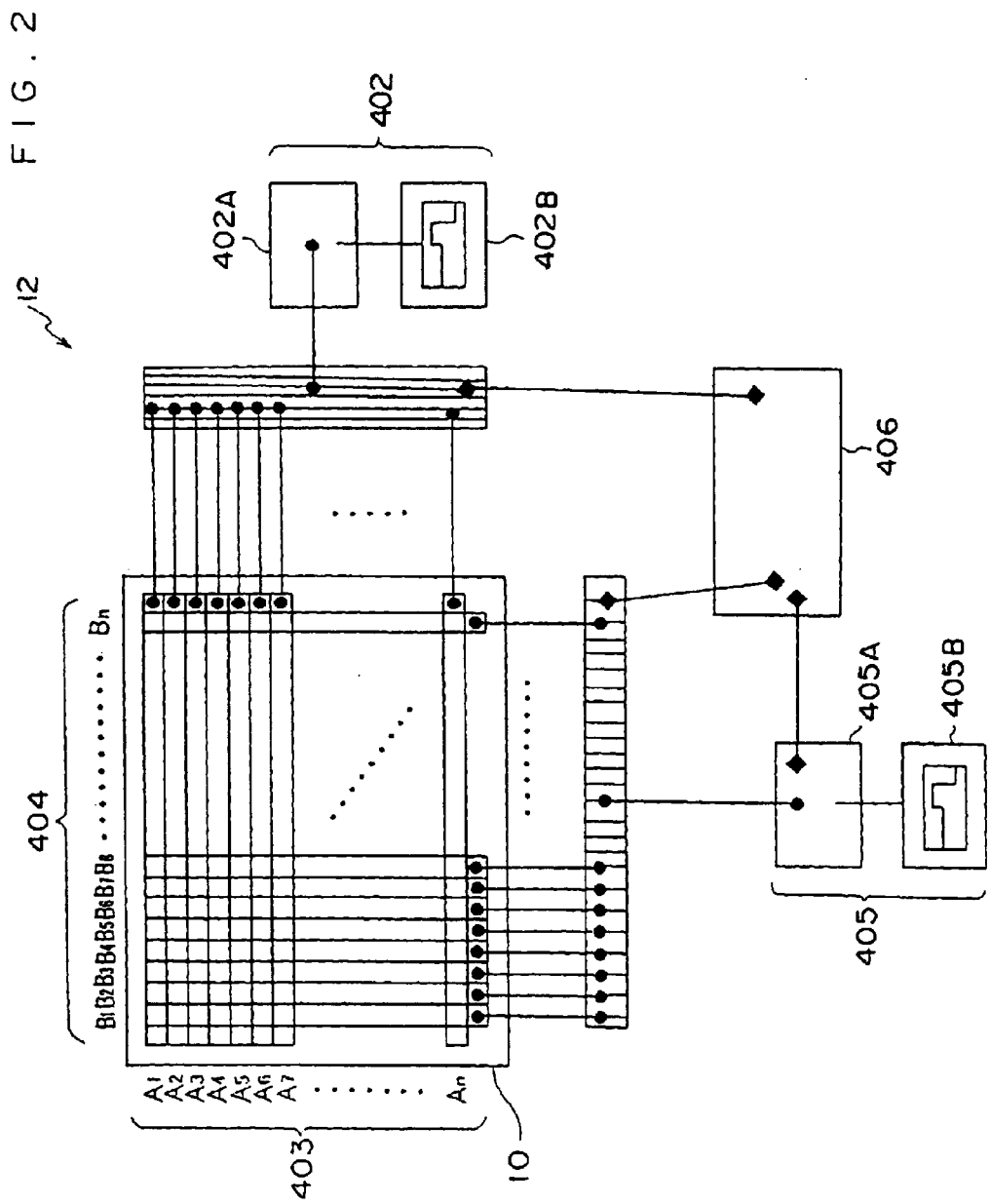
FIG. 2 is a schematic diagram of the image forming device according to the second embodiment.

FIG. 2 shows an image forming device 12 for forming an image on the image display medium 110 according to the present embodiment using a simple matrix. By forming a simple matrix with electrodes 403An and 404Bn (wherein n is a positive number), and by enclosing plural of particles having different charging property in the spaces formed by the electrodes 403An and 404Bn, an electric potential is generated on the electrodes 403An and 404Bn using an electric field generating device 402 composed of a waveform generating device 402B and an electric source 402A or an electric field generating device 405 composed of a waveform generating device 405B and an electric source 405A. The electric potential driving timing of the electrodes is controlled by a sequencer 406, whereby the driving of the voltage in each electrode is controlled. An electric field capable of driving particles by a line can be applied on the electrodes 403A1 to An on one surface, and an electric field according to the image information can be simultaneously applied on the electrodes 404B1 to Bn on the other surface.

Figure 3:
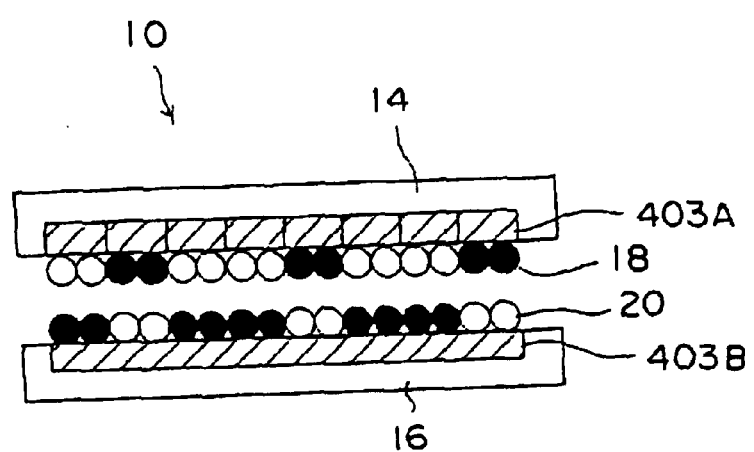
FIG. 3 is a schematic diagram of a example of the image display medium.
Figure 4:
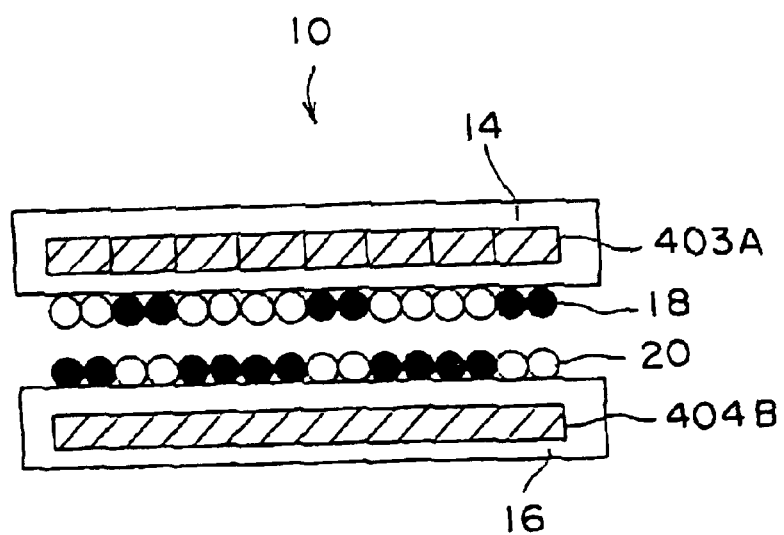
FIG. 4 is a schematic diagram of the other example of the image display medium.
Figure 5:
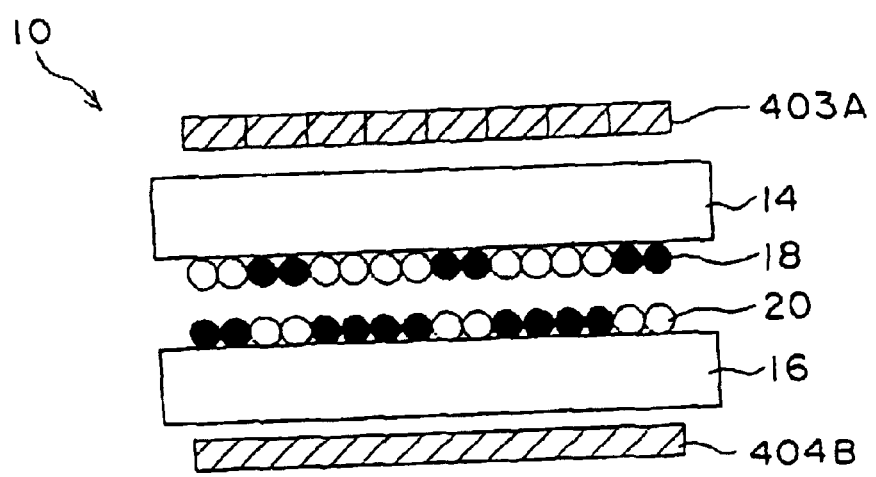
FIG. 5 is a schematic diagram of the other example of the image display medium.

FIGS. 3, 4 and 5 show the cross-section of the image forming portion at any plane of FIG. 2. The particles contact with the surfaces of the electrodes or the surfaces of the substrates, and at least one of the substrates is transparent so that the color of the particles can be seen through the substrate from outside. The electrodes 403A and 404B may be embedded to and integrated with the substrates as shown in FIGS. 3 and 4, or may be separated from the substrates as shown in FIG. 5.

By applying suitable electric field on the above-mentioned device, simple matrix-driven display can be carried out. The driving can be carried out as long as the particles have a threshold value of moving relative to the electric field, and not limited by the color of particles, charging polarity, charge amount, and the like.

Third Embodiment

Hereinafter the third embodiment of the invention is specifically explained with referring to the drawings. The third embodiment is an image forming device using a printing electrode.

Figure 6:
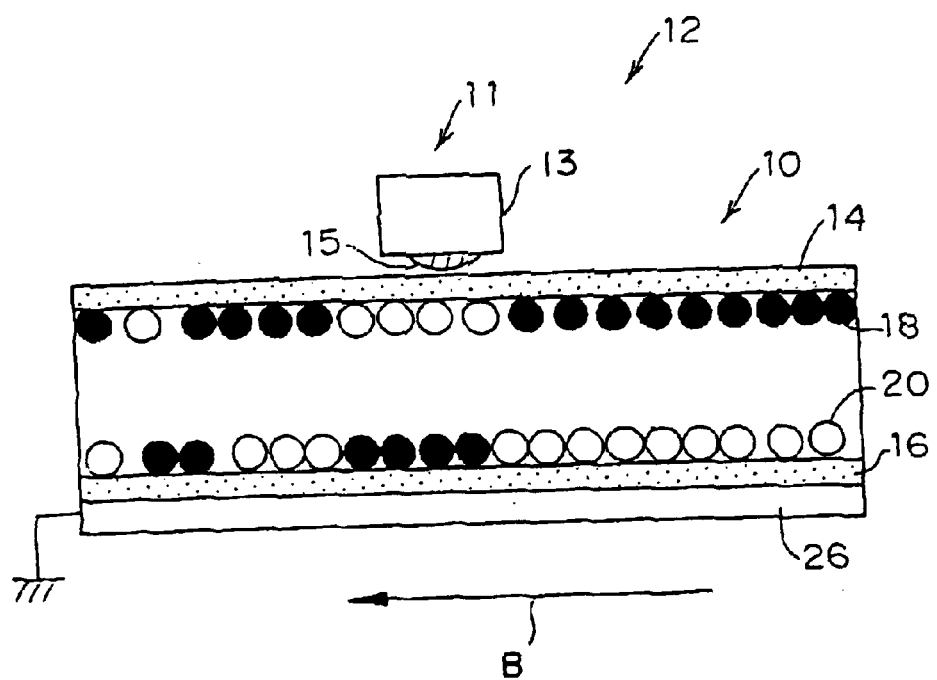
FIG. 6 is a schematic diagram of the image forming device according to the third embodiment.
Figure 7:
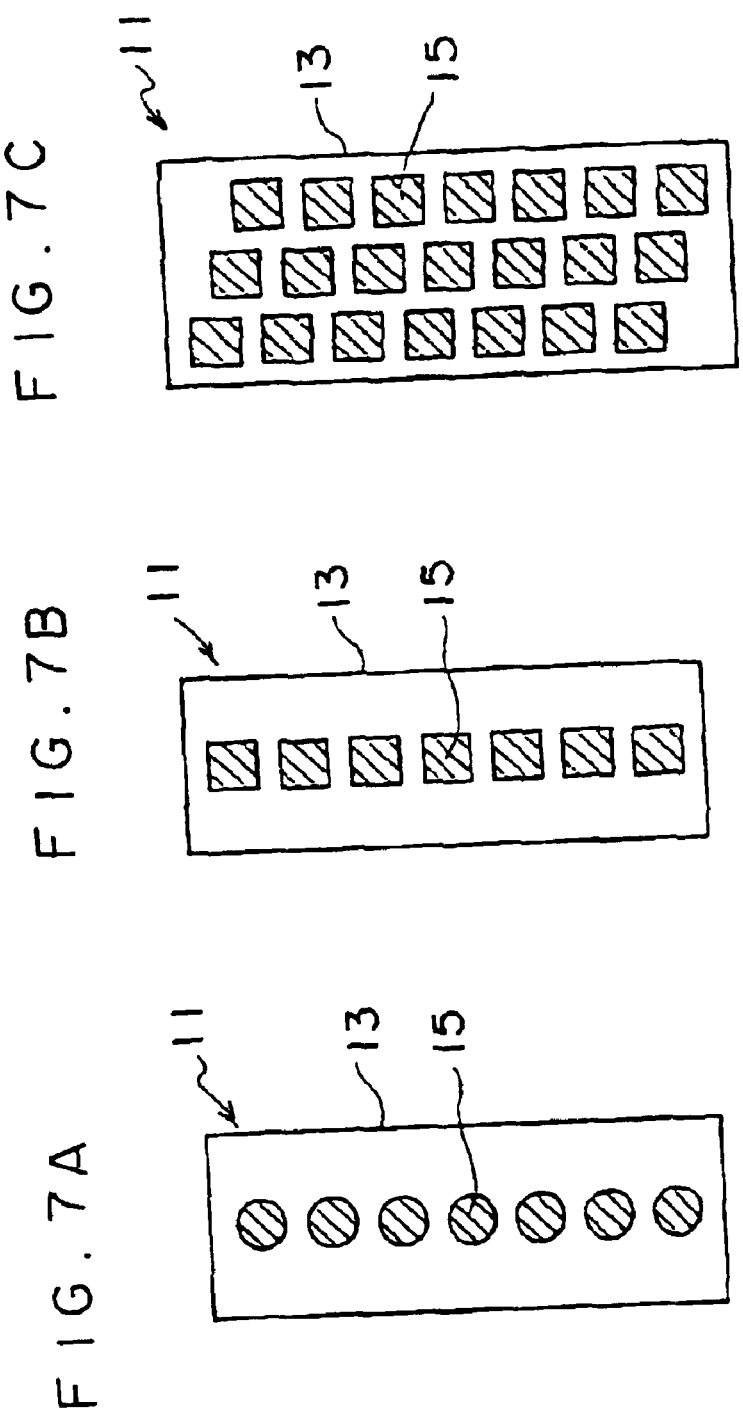
FIGS. 7A, 7B and 7C are each a diagram of an electrode pattern of a printing electrode.

As shown in FIGS. 6 and 7A, a printing electrode 11 comprises a substrate 13 and plural of electrodes 15 each having a diameter of, for example, 100 $\mu$m. An image forming device 12 comprises the printing electrode 11, an opposing electrode 26, and the like.

Furthermore, as shown in FIG. 7A, the plural of electrodes 15 are aligned in a line at given intervals on the one surface of the display substrate 14, along with the direction approximately crosswise direction (i.e., main scanning direction) to the conveyance direction of the image display device 10 (direction B as indicated by an arrow in FIG. 6), according to the resolution of the image. The electrodes may have square shape as shown in FIG. 7B, or may be placed to form a matrix as shown in FIG. 7C.

Figure 8:
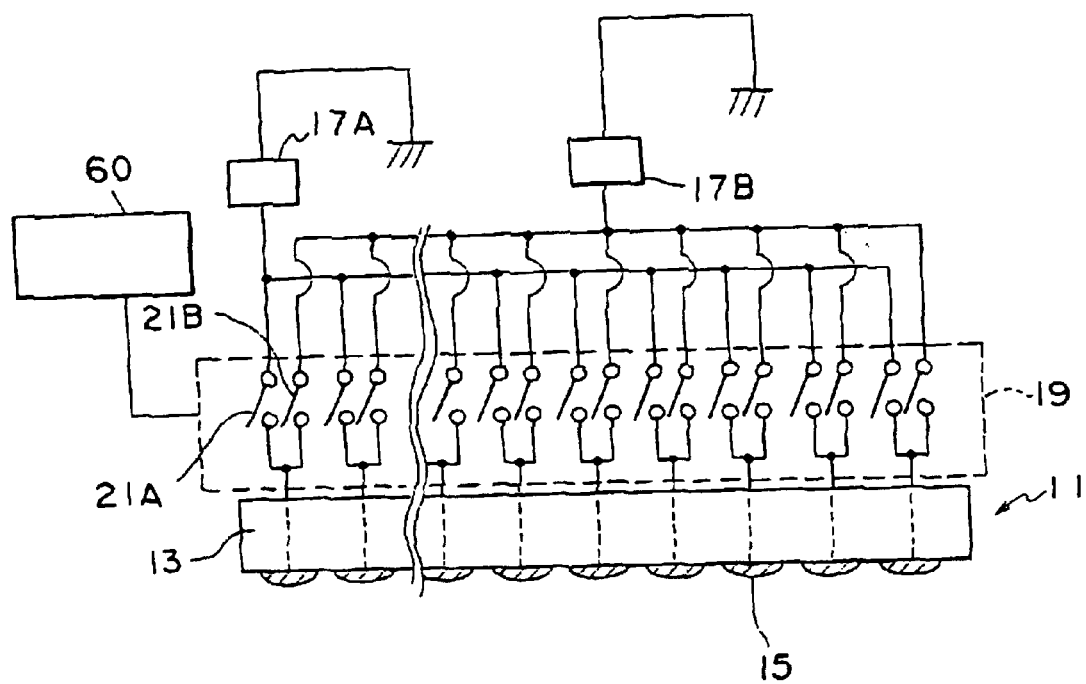
FIG. 8 is a schematic diagram of a printing electrode.

As shown in FIG. 8, each of the electrodes 15 is connected with an AC electric source 17A and DC electric source 17B via a connection controlling portion 19. The connection controlling portion 19 comprises plural of switches, each of the switches has a switch 21A in which one end is connected to the electrode 15 and the other end is connected to the AC electric source 17A and a switch 21B in which one end is connected to an electrode 15 and the other end is connected to the AC electric source 17B.

These switches are on-off controlled by a controlling portion 60 to electrically connect the AC electric source 17A and DC electric source 17B with the electrode 15, whereby alternate current voltage, direct current voltage, or voltage wherein alternate current voltage and direct current voltage are superimposed can be applied.

Next, the operation of the third embodiment is explained.

When the image display medium 110 is conveyed between the printing electrode 11 and the opposing electrode 26 by a conveying means (not depicted in the figures) in the direction of the arrow B in the FIG. 6, the controlling portion 60 instructs the connection controlling portion 19 to switch-on all of the switches 21A, whereby alternate voltage is applied on all of the electrodes 15 from the AC electric source 17A.

In this case, the image display medium is a medium in which two or more kinds of particles are enclosed in a gap between a pair of substrates having no electrode.

When alternate voltage is applied on the electrodes 15, the black particles 18 and white particles 20 in the image display medium 110 reciprocate between the display substrate 14 and non-display substrate 16, whereby the black particles 18 and white particles 20 are friction-charged by friction between the particles or friction between the particles and the substrates, and for example, the black particles 18 are positively charged and the white particles 20 are not charged or negatively charged. Hereinafter the white particles 20 are explained to be negatively charged.

The controlling portion 60 instructs the connection controlling portion 19 to switch-on only the switches 17B, which correspond to the electrodes 15 corresponding to the position of the image data, whereby direct voltage is applied on the electrodes 15 corresponding to the position of the image data. For example, direct voltage is applied to the non-image portion but not applied to the image portion.

As shown in FIG. 6, when direct voltage is applied to the electrodes 15, the positively charged black particles 18, which exist in the portion where the printing electrode 11 is opposing to the display substrate 14, move to the non-display substrate 16 by the effect of electric field. In addition, the negatively charged white particles 20, which exist on the non-display substrate 16, move to the display substrate 14 by the effect of electric field. Thus, since the white particles 20 solely appear on the display substrate 14, image is not displayed on the portion corresponding to the non-image portion.

On the other hand, when direct voltage is not applied to the electrodes 15, the positively charged black particles 18, which exist in the portion where the printing electrode 11 is opposing to the display substrate 14, are maintained on the display substrate 14 by the effect of electric field. In addition, the positively charged black particles 18 on the non-display substrate 16 move to the display substrate 14 by the effect of electric field. Thus, since the black particles 18 solely appear on the display substrate 14, image is displayed on the portion corresponding to the image portion.

In this way, since the black particles 18 solely appear on the display substrate 14, image is displayed on the portion corresponding to the image portion.

In this way, the black particles 18 and white particles 20 move according to the image, and the image is displayed on the display substrate 14. When the white particles 20 are not charged, only the black particles 18 move by the effect of electric field. Since the black particles 18 on the portion where an image is not displayed move to the non-display substrate 16, and are masked by the white particles 20 when they are seen from the side of the display substrate 14, the image can be displayed. Furthermore, the image displayed is maintained by the adhesion force of the particles, which force is inherent to the particles, after the electric field generated between the substrates of the image display medium 110 is disappeared. Furthermore, since these particles can move again when another electric field is generated between the substrate, an image can be displayed repeatedly by the image forming device 12.

Thus, the image forming device of the present invention is highly safe because the charged particles are moved by electric field using air as a medium. Furthermore, since air has low viscous resistance, the image forming device of the present invention can satisfy high-speed response property.

Fourth Embodiment

Hereinafter the fourth embodiment of the present invention is specifically explained with referring to the figures. The fourth embodiment is an image forming device using a electrostatic latent image bearing body.

Figure 9:
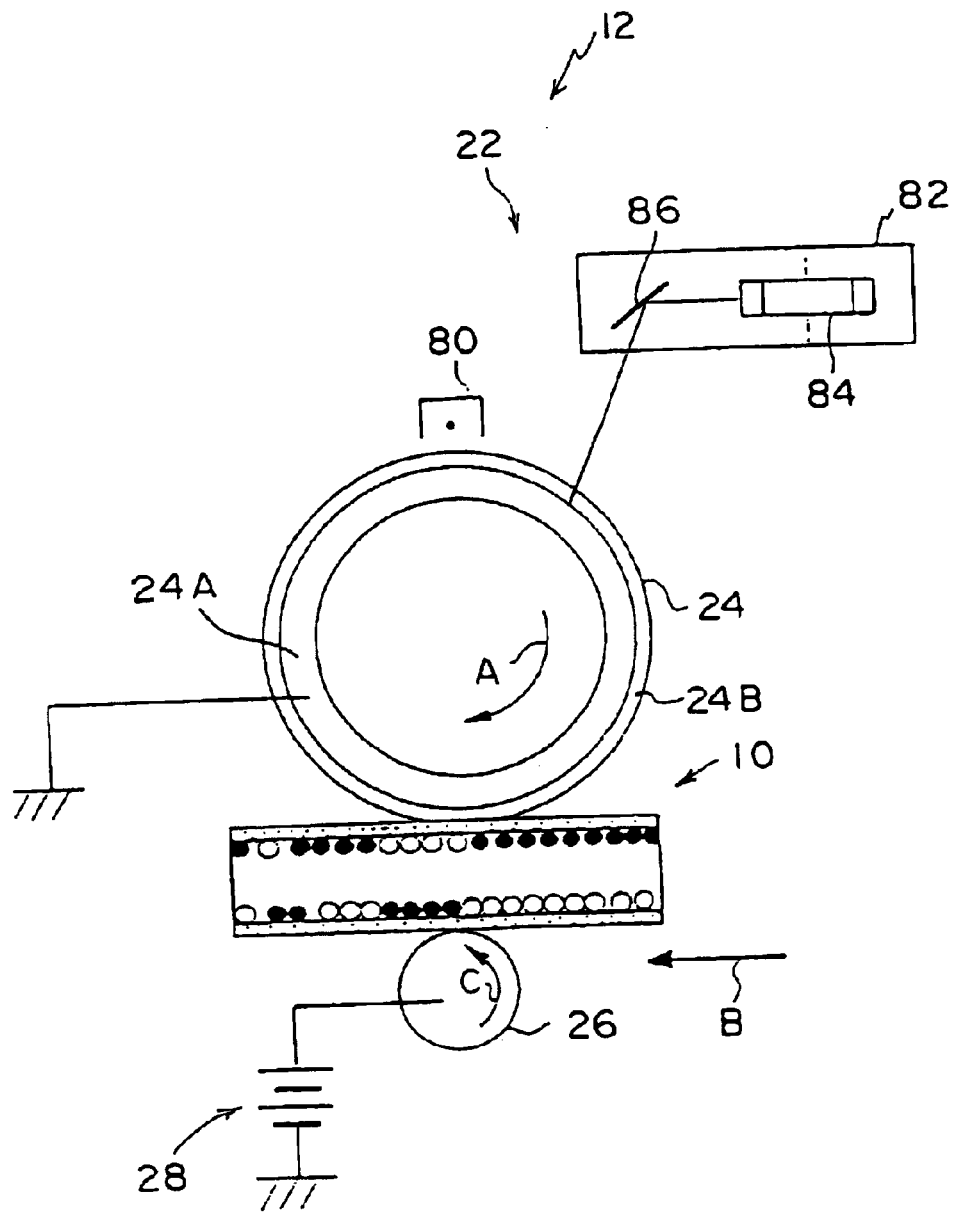
FIG. 9 is a schematic diagram of the image forming device according to the fourth embodiment.

FIG. 9 shows an image forming device 12 of the fourth embodiment. The image forming device 12 comprises an electrostatic latent image forming portion 22, a drum-shaped electrostatic latent image bearing body 24, an opposing electrode 26, a direct current voltage electric source 28, and the like.

The electrostatic latent image forming portion 22 comprises a charging device 80 and a light beam scanning device 82. In this case, a photosensitive drum 24 can be used as the electrostatic latent image bearing body 24. The photosensitive drum 24 comprises a drum-shaped conductive base 24A made of aluminum, SUS, and the like and a light conductive layer 24B formed thereon. For the light conductive layer, various known materials can be used. For example, inorganic light conductive material such as $\alpha$-Si, $\alpha$-Se, $As_2Se_3$, and the like, organic light conductive materials such as PVK/TNF, and the like can be used. The light conductive layer can be formed by plasma CVD, deposition, dipping, and the like. Furthermore, if necessary, a charge transport layer, overcoat layer, and the like may be formed.

The charging device 80 uniformly charges the surface of the electrostatic latent image bearing body 24 to the desired electric potential. The charging device 80 may be a device which can be charge the surface of photosensitive drum 24 to the desired electric potential. In this embodiment, Colotron, which uniformly charges the surface of photosensitive drum 24 by applying high voltage to an electrode wire to generate corona discharge between the electrostatic latent image bearing body 24, is used. Besides this, known various charging devices, such as a device which charges the surface of the light sensitive drum by contacting a conductive roll member, brush or film member, and the like with a light sensitive drum 24 and applying voltage to the member, and the like can be used.

The light beam scanning device 82 irradiates the charged surface of the electrostatic latent image bearing body 24 with micro spot light based on image signal. The light beam scanning device 82 maybe a device which can irradiate the charged surface of the light sensitive drum 24 with light beam according to image information to form a electrostatic latent image on the uniformly-charged light sensitive drum 24. In this embodiment, a ROS (Raster Output Scanner) device in which a laser beam adjusted to have desired spot diameter is switched according to the image signal by an image forming optical system comprising a polygon mirror 84, a return mirror 86 and a light source and lens (which are not shown in the figures), and the like, while the surface of the light sensitive drum 24 is light scanned by the polygon mirror 84, is used. Besides this, an LED head which comprises LEDs aligned according to the desired resolution, and the like may be used.

The conductive base 24A of the electrostatic latent image bearing body 24 is grounded. In addition, the electrostatic latent image bearing body 24 revolves to the direction of the arrow A in the figure.

Figure 10:
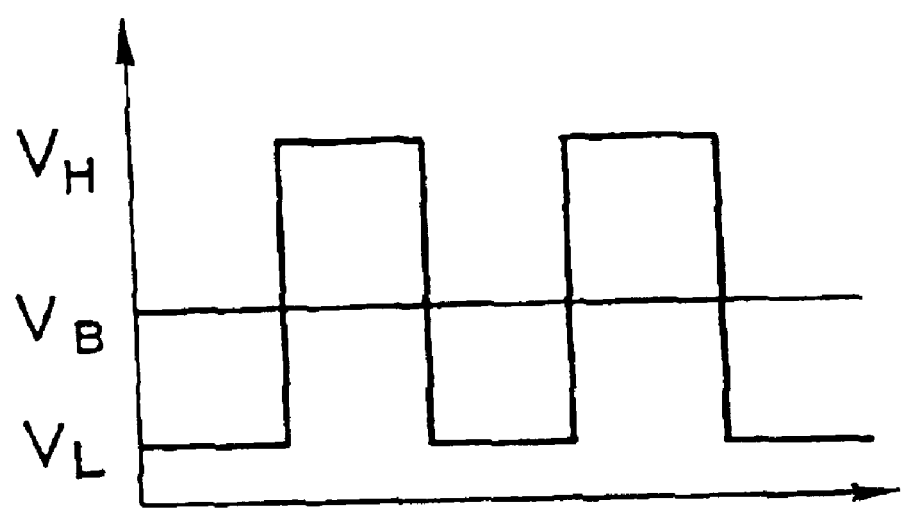
FIG. 10 is a graph showing potential in a electrostatic latent image bearing body and opposing electrodes.

The opposing electrode 26 is constituted by, for example, a conductive roll member having elasticity, by which more stable adhesion with the image display medium 110 can be achieved. Furthermore, the opposing electrode 26 is placed opposing to the electrostatic latent image bearing body 24 across the image display medium 10, which is conveyed to the direction of the arrow B by a conveying means (not shown in the figure). The opposing electrode 26 is connected to the direct voltage electric source 28. Bias voltage VB is applied to the opposing electrode 26 by the direct voltage electric source 28. As shown in FIG. 10, the bias voltage $V_B$, to be applied has, for example, intermediate electric potential of the electric potential $V_H$, which is electric potential of the positively charged portion on the electrostatic latent image bearing body 24, and the electric potential $V_L$, which is electric potential of the uncharged portion. Furthermore, the opposing electrode 26 revolves to the direction of the arrow C.

Next, the operation of the fourth embodiment is explained.

When the electrostatic latent image bearing body 24 starts to revolve to the direction of the arrow A of the FIG. 9, an electrostatic latent image is formed on the electrostatic latent image bearing body 24 by the electrostatic latent image forming portion 22. On the other hand, the image display medium 10 is conveyed by a conveying means (not shown in the figure) to the direction of the arrow B of the FIG. 9, and is conveyed between the electrostatic latent image bearing body 24 and opposing electrode 26.

When the opposing electrode 26 is applied with a bias voltage $V_B$ as shown in FIG. 10, the electric potential of the position opposing to the opposing electrode 26 on the electrostatic latent image bearing body 24 becomes $V_H$. Therefore, when the portion opposing to the display substrate 14 on the electrostatic latent image bearing body 24 (non-image portion) is positively charged and the black particles 18 are adhered to the portion opposing to the electrostatic latent image bearing body 24 on the display substrate 14, the positively charged black particles 18 move from the display substrate 14 to the non-display substrate 16 and adhere to the non-display substrate 16. Thus, since the white particles 20 solely appear on the display substrate 14, an image is not displayed on the portion corresponding to the non-image portion.

On the other hand, when the portion opposing to the display substrate 14 on the electrostatic latent image bearing body 24 (image portion) is not positively charged and the black particles 18 are adhered to the portion opposing to the opposing electrode 26 on the non-display substrate 16, the electric potential on the portion opposing to the opposing electrode 26 on the electrostatic latent image bearing body 24 is $V_L$, the positively charged black particles 18 move from the non-display substrate 16 to the display substrate 14 and adhere to the substrate 14. Thus, since the black particles 18 solely appear on the display substrate 14, an image is displayed on the portion corresponding to the image portion.

In this way, the black particles 18 move according to the image, whereby an image is displayed on the display substrate 14. In addition, even after the electric field generated between the substrates of the image display medium 110 is disappeared, the image displayed is maintained by the adhesiveness inherent to the particles and image force of the substrates. Furthermore, since the black particles 18 and white particles 20 can move again when another electric field is generated between the substrate, an image can be displayed repeatedly by the image forming device 12.

As mentioned above, since the bias voltage is applied to the opposing electrode 26, the black particles 18 can be moved even they adhered any portion of the display substrate 14 and the non-display substrate 16. Therefore, the black particles 18 need not to adhere to one of the substrates in advance. Furthermore, an image having high contrast and high acutance can be obtained. Moreover, the image forming device of the present invention is highly safe since the charged particles are moved by electric field using air as a medium. Furthermore, since air has low viscous resistance, the image forming device of the present invention can satisfy high-speed response property.

In the above, the embodiments for carrying out the image forming device of the present invention using the image forming medium of the present invention are explained with referring to the drawings. However, the invention is not limited to the above embodiments except for using the above-mentioned particles, and desired constitutions can be used for the invention. Furthermore, although the combination of the black and white particles is used in the above, the invention is not limited to the combination, and if necessary, colored particles can be suitably selected.

EXAMPLES

Hereinafter the present invention is more specifically explained with referring to Examples. The Examples should not be construed to limit the invention. In the following Examples and Comparative Examples, the effect of the invention is confirmed by using the image display medium according to the first embodiment as explained in the above-mentioned [embodiments for carrying out the image forming device of the present invention] or the image forming device (the image display medium or image forming device having the constitution depicted in FIG. 1) and altering the constitution of the white particles 20 and black particles 18. The size, material, and the like for each of the members are similar to those explained in the above-mentioned [embodiments for carrying out the image forming device of the present invention].

(Preparation of White Particles 1)

Preparation of a Dispersion Solution A

The following composition is mixed and crushed by a ball-mill using zirconia balls (10 mm$\phi$) for 20 hrs to prepare a dispersion solution A.

| <Composition> | |
|---|---|
| Cyclohexyl methacrylate | 64 parts by mass |
| Titanium dioxide (white pigment) (the primary particle size 0.3 μm, Tipaque CR63: manufactured by Ishihara Sangyo Kaisha, Ltd.) | 30 parts by mass |
| Polymer particles (hollow particles) (the primary particle size 0.3 μm, SX866(A): manufactured by JSR) | 5 parts by mass |
| Charge controlling agent (SBT-5-0016: manufactured by Orient Chemical Industries, Ltd.) | 1 part by mass |

Preparation of a Dispersion Solution B

The following composition is mixed and crushed by a ball-mill according to the method similar to the dispersion solution A to give a dispersion solution B.

| <Composition> | |
|---|---|
| Calcium carbonate | 40 parts by mass |
| Water | 60 parts by mass |

Preparation of a Mixed Solution C

The following composition is mixed, degassed by a ultrasonic device for 10 min and stirred by a emulsifier to prepare a mixed solution C.

| <Composition> | |
|---|---|
| Dispersion solution B | 7.0 g |
| 20% saline solution | 50 g |

The dispersion solution A (35 g), divinylbenzene (1 g) and AIBN (azobisisobutyronitrile, polymerization initiator 0.35 g) are measured and thoroughly mixed, and degassed by a ultrasonic device for 10 min. The mixed solution is fed to the above-mentioned mixed solution C and the mixture is emulsified by a emulsifier. The emulsified solution is then fed in a bottle. The bottle is plugged with a silicone plug, sufficiently degassed using a injection needle, and nitrogen gas is charged. The mixture is then reacted at 70° C. for 10 hrs to give particles. The obtained particle powder is dispersed in ion-exchanged water. Calcium carbonate is decomposed with an aqueous hydrochloric acid, and the mixture is filtered. The residue is washed with sufficient diluted water, filtered with a nylon filter having openings of 10 μm and 15 μm to uniform the particle size. The particles are dried to give white particles 1 having the average particle diameter of 13 μm (particles for a display device of the present invention).

(Preparation of Black Particles 1)

Black particles 1 are prepared according to the method similar to the preparation of the white particles 1 except that the following dispersion solution is used instead of the dispersion solution A. The obtained black particles 1 are washed by stirring in methanol (10-fold amounts relative to the mass of the particles) for 2 hrs and dried at 65° C. for 120 min. The average particle diameter of the obtained black particles 1 is 13.5 μm.

Preparation of a Dispersion Solution

The following composition is mixed and crushed by a ball-mill using zirconia balls (10 mmφ) for 20 hrs to prepare a dispersion liquid.

| <Composition> | |
|---|---|
| Methyl methacrylate | 88.2 parts by mass |
| Diethylaminoethyl methacrylate | 0.8 part by mass |
| Microlith black | 10 parts by mass |
| (manufactured by Ciba Specialty Chemicals Inc.) | |
| Charge controlling agent | 1 part by mass |
| (COPY CHARGE PSY VP2038: manufactured by Clariant Japan K. K.) | |

(Preparation of Black Particles 2)

The black particles 2 are prepared according the preparation of the black particle 1 except that the obtained black particles are washed by stirring in methanol (10-fold amounts relative to the mass of the particles) for 1 hrs and dried at 65° C. for 120 min.

(Preparation of Black Particles 3)

The black particles 3 are prepared according the preparation of the black particle 1 except that the obtained black particles are washed by stirring in methanol (10-fold amounts relative to the mass of the particles) for 30 min and dried at 65° C. for 120 min.

(Preparation of Black Particles 4)

The black particles 4 are prepared according the preparation of the black particle 1 except that the black particles 3 are further washed by stirring in methanol (10 fold amounts relative to the mass of the particles) for 2 hrs and dried at 65° C. for 120 min.

(Preparation of Black Particles 5)

The black particles 5 are prepared according the preparation of the black particle 1 except that the obtained black particles are washed by stirring in methanol (10-fold amounts relative to the mass of the particles) for 2 hrs and dried at 65° C. for 30 min.

EXAMPLES 1 TO 3, COMPARATIVE EXAMPLES 1 AND 2

According to Table 1, particles for a display device are prepared by mixing white particles and black particles. The particles are enclosed in the gaps between substrates (the display substrate 14 and non-display substrate 16) oppositely positioned in the image display medium according to the first embodiment and the image forming device for forming an image on the medium, respectively, to give the image display media of Examples 1 to 3 and Comparative Examples 1 and 2. The compounding ratio of the white particles and black particles is adjusted to (white particles-:black particles)=2:1.

(Evaluation)

The following evaluations are carried out for the obtained image display media and image forming device. The evaluation results are shown in Table 1 with the weight reduction ratio (%) at 100° C. to 240° C. of whole particles for a display device comprising the white particles and black particles.

Driving Voltage

When 100 V of direct current voltage is applied to a transparent electrode on the display substrate 14 of the image display medium 10 in which the white particles 20 and black particles 18 have been enclosed by the mass ratio of 2:1, a part of the white particles 20 charged by the negative polarity at the non-display substrate 16 starts to move to the display substrate 14, and when direct current voltage (driving voltage) is applied, many white particles 20 move to the display substrate 14 and the display density is almost saturated. At this time, the black particles 18 positively charged move to the non-display substrate 16 side. Although the voltage is thereafter adjusted to 0 V, the particles on the display substrate do not move, and the display density does not change. The direct current voltage applied at this time is driving voltage, which is shown in Table 1.

The sensory evaluation of the obtained images are carried out by, measuring five points in a patch of 20 mm×20 mm using a density meter X-Rite 404 in each image before and after switching the polarity of voltage, and calculating the average of the reflection densities for the five points. The contrast is calculated by the following equation. When the contrast is not less than 8.0, the image is considered to be fine.

Contrast=average black reflection density/average white reflection density

TABLE 1

| | Particles for a display device | | | | |
|---|---|---|---|---|---|
| | Black particles species | White Particles species | Weight reduction rate (%) | Driving voltage (V) | Contrast |
| Example 1 | 1 | 1 | 0.149 | 150 | 12.6 |
| Example 2 | 2 | 1 | 0.23 | 150 | 10.7 |
| Example 3 | 4 | 1 | 0.17 | 150 | 8.51 |
| Comparative Example 1 | 3 | 1 | 0.475 | 150 | 4 |
| Comparative Example 2 | 5 | 1 | 0.554 | 150 | 2.8 |

From the results of Table 1, it is proved that the density of the image is well when the weight reduction rate of whole particles for a display device is low. Furthermore, it is observed that the particles having high weight reduction rate could not be displayed repeatedly. As such, homogeneous image density, fine contrast and colors having fine reflection density can be displayed.

As mentioned above, according to the invention, particles for a display device, which do not decrease the contrast due to decrease in the density of the image and do not generate image unevenness due to decrease in the uniformity of the image during reiterative writing, can be provided. Furthermore, an image display medium, whose driving voltage can be set lower, and which can ensure a stable display image for a long period even under external impact or long-time standing, and an image forming device using the same, can be provided.

What is claimed is:

1. Particles for a display device which can be positively or negatively charged and have a color, wherein
the particles have a weight reduction rate of not more than 0.3% at 100° C. to 240° C.

2. Particles for a display device according to claim 1, wherein the particles are produced by a method comprising the step of suspension polymerization, emulsion polymerization or dispersion polymerization.

3. Particles for a display device according to claim 2, wherein the particles are produced by undergoing an additional washing step.

4. Particles for a display device according to claim 3, wherein the washing step is carried out by dispersing and stirring the particles in water or an organic solvent.

5. Particles for a display device according to claim 3, wherein the washing step is carried out by dispersing the particles in a solvent and heating and applying a vacuum to the obtained dispersion liquid.

6. Particles for a display device according to claim 1, wherein the particles comprise polymer particles.

7. Particles for a display device according to claim 6, wherein the polymer particles are hollow particles.

8. An image display medium, which comprises a pair of opposed substrates and a group of particles comprising at least two or more kinds of particles, the group being enclosed in a gap between the pair of substrates, wherein at least one of the two or more kinds of particles can be positively charged and at least one of the other particles can be negatively charged, and the particles which can be positively charged and the particles which can be negatively charged have colors that are different from each other, and wherein the particles which can be positively charged and the particles which can be negatively charged have a weight reduction rate of not more than 0.3% at 100° C. to 240° C.

9. An image display medium according to claim 8, wherein the particles which can be positively charged and the particles which can be negatively charged are produced by a method comprising the step of suspension polymerization, emulsion polymerization or dispersion polymerization.

10. An image display medium according to claim 9, wherein the particles which can be positively charged and the particles which can be negatively charged are produced by undergoing an additional washing step.

11. An image display medium according to claim 10, wherein the washing step is carried out by dispersing and stirring the particles in water or an organic solvent.

12. An image display medium according to claim 10, wherein the washing step is carried out by dispersing the particles in a solvent and heating and applying a vacuum to the obtained dispersion liquid.

13. An image display medium according to claim 8, wherein the particles which can be positively charged and the particles which can be negatively charged comprise polymer particles.

14. An image display medium according to claim 13, wherein the polymer particles are hollow particles.

15. An image forming device comprising:

an image display medium comprising a pair of opposed substrates and a group of particles comprising at least two or more kinds of particles, which group is enclosed in a gap between the pair of substrates, wherein at least one of the two or more kinds of particles can be positively charged by external stimulation and at least one of the other particles can be negatively charged by external stimulation, and the particles which can be positively charged by external stimulation and the particles which can be negatively charged by external stimulation have colors that are different from each other; and electric field production means for producing an electric field corresponding to an image, between the pair of substrates, wherein the particles which can be positively charged and the particles which can be negatively charged have a weight reduction rate of not more than 0.3% at 100° C. to 240° C.

16. An image forming device according to claim 15, wherein the particles which can be positively charged and the particles which can be negatively charged are produced by a method comprising the step of suspension polymerization, emulsion polymerization or dispersion polymerization.

17. An image forming device according to claim 16, wherein the particles which can be positively charged and the particles which can be negatively charged are produced by undergoing an additional washing step.

18. An image forming device according to claim 17, wherein the washing step is carried out by dispersing and stirring the particles in water or an organic solvent.

19. An image forming device according to claim 17, wherein the washing step is carried out by dispersing the particles in a solvent and heating and applying a vacuum to the obtained dispersion liquid.

20. An image forming device according to claim 15, wherein the particles which can be positively charged and the particles which can be negatively charged comprise polymer particles.

21. An image forming device according to claim 20, wherein the polymer particles are hollow particles.

* * * * *